United States Patent

[11] 3,554,342

| [72] | Inventor | Romas B. Spokas |
| --- | --- | --- |
| | | Rockford, Ill. |
| [21] | Appl. No. | 785,923 |
| [22] | Filed | Dec. 23, 1968 |
| [45] | Patented | Jan. 12, 1971 |
| [73] | Assignee | Borg-Warner Corporation |
| | | Chicago, Ill. |
| | | a corporation of Delaware |

[54] TORQUE TRANSMITTING DEVICE
3 Claims, 4 Drawing Figs.

[52] U.S. Cl. .................................................. 192/70.18,
192/70.28
[51] Int. Cl. .................................................... F16d 13/18,
F16d 13/44
[50] Field of Search........................................ 192/70.27,
70.28, 70.18

[56] References Cited
UNITED STATES PATENTS

| 2,257,877 | 10/1941 | Binder............................ | 192/70.28 |
| 2,672,226 | 3/1954 | Zeidler.......................... | 192/70.27(X) |
| 3,061,062 | 10/1962 | Smirl............................. | 192/70.18 |
| 3,162,284 | 12/1964 | Montgomery et al.......... | 192/70.27(X) |

*Primary Examiner*—Allan D. Herrmann
*Attorneys*—Donald W. Banner, Lyle S. Motley, C. G. Stallings and William S. McCurry ABSTRACT: A torque transmitting device includes a plurality of axially shiftable pressure plates connected to a drive housing arranged for cooperation with a flywheel, parallel flexible drive straps distribute the torque from the drive housing among the several pressure plates, and a separating means provides for axially separating the pressure plates from the flywheel in a disengaged condition.

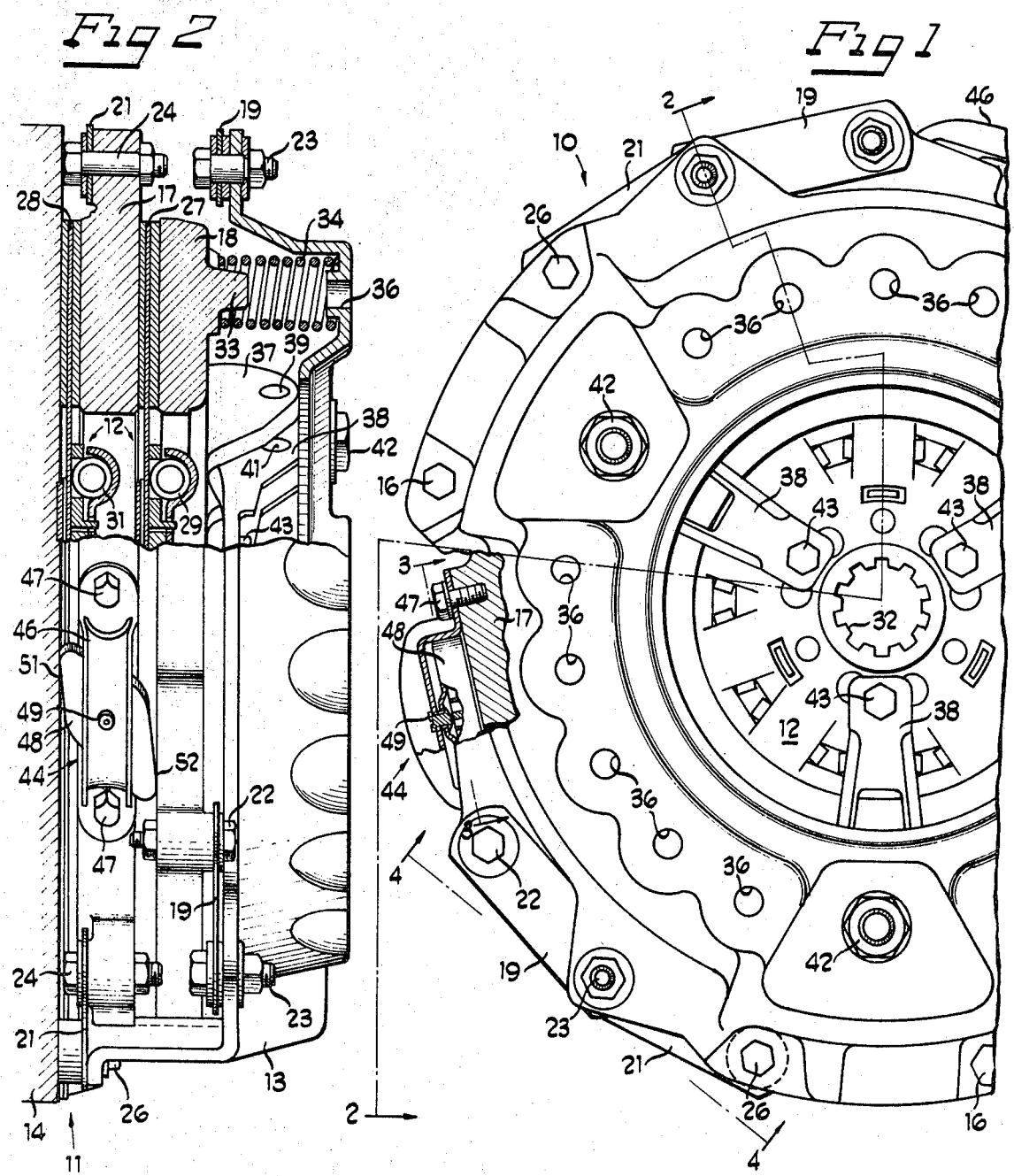

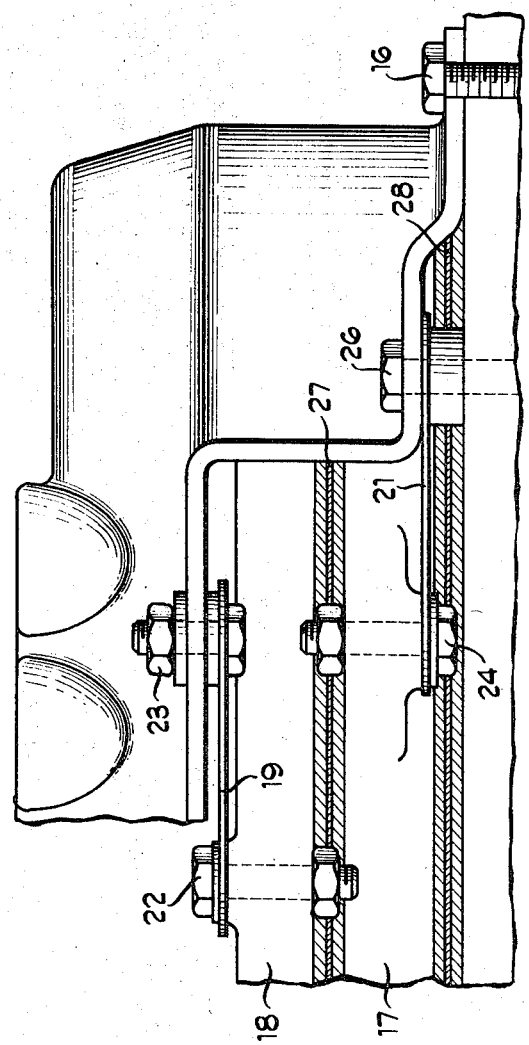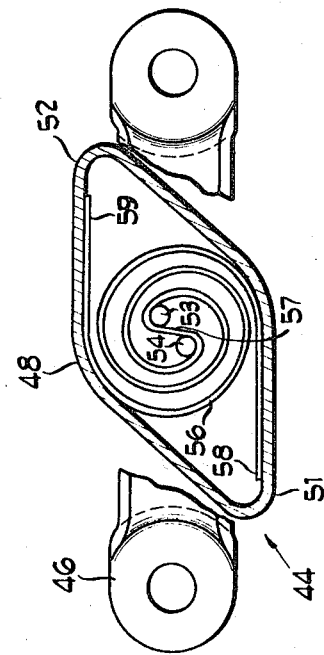

3,554,342

TORQUE TRANSMITTING DEVICE

SUMMARY OF THE INVENTION

The present invention relates generally to torque transmitting devices and more particularly to a multiple disc clutch employing a strap drive.

Among the objects and advantages of the present invention are to provide a multiple disc clutch employing parallel drive straps, and to provide a multiple disc clutch having separating means for determining the axial spacing of certain of the clutch elements. Other objects and advantages of the invention will become apparent from consideration of the following description together with the drawings.

BRIEF DESCRIPTION OF THE DRAWINGS

FIG. 1 is a fragmentary elevation view of a torque transmitting device according to the present invention;

FIG. 2 is an end view, partially in section, taken along the line 2-2 of FIG. 1;

FIG. 3 is an enlarged fragmentary view taken along the line 3-3 of FIG. 1; and

FIG. 4 is an enlarged fragmentary view taken along the line 4-4 of FIG. 1.

DESCRIPTION OF THE PREFERRED EMBODIMENT

The reference character 10 generally indicates a torque transmitting device according to the present invention, having a rotatable input assembly 11, and a rotatable output assembly 12.

Rotatable output assembly 12 includes a pair of friction plates 27, 28 axially arranged in alternating sequence with pressure plates 17, 18. Friction plate 28 is located between flywheel 14 and intermediate pressure plate 17, while friction plate 27 is located between intermediate pressure plate 17 and terminal pressure plate 18. Friction plates 27 and 28 include damper assemblies 29 and 31, and are provided with hub portions for connection to an output shaft by means of splined connection 32. The splined connection permits axial shifting of the friction plates between engaged and disengaged conditions.

In the engaged condition, friction plate 28 is clamped in frictional engagement between flywheel 14 and intermediate pressure plate 17, while friction plate 27 is clamped between intermediate pressure plate 17 and terminal pressure plate 18. In the disengaged condition, the two pressure plates are moved axially away from flywheel 14 releasing the friction plates 27 and 28.

Input assembly 11 includes drive member 13 in the form of a housing connected to flywheel 14 by means of cap screws 16 and 26. Enclosed within housing-shaped drive member 13 are intermediate pressure plate 17 and terminal pressure plate 18, axially spaced from flywheel 14. Pressure plates 17 and 18 are axially shiftable with respect to flywheel 14 and drive housing 13 to define engaged and disengaged conditions of the torque transmitting device. An important feature of the present invention resides in the sets of drive straps 19 and 21. Drive straps 19 are connected to terminal pressure plate 18 by means of cap screws 22 and to drive housing 13 by means of cap screws 23. The other drive straps 21 are connected to intermediate pressure plate 17 by means of cap screws 24 and to drive housing 13 by means of cap screws 26. Drive straps 19 are thus arranged in parallel driving relationship with drive straps 21 providing separate and independent means for the transmission of drive torque from drive housing 13 to each of the two pressure plates 17 and 18. The transmitted torque is divided among the pressure plates 17, 18 and the sets of drive straps 19 and 21. Since each set of drive straps transmits only a portion of the torque requirements, the straps may be made correspondingly more flexible without sacrificing torque transmitting capability of the device. The more flexible drive straps in turn facilitate separation of the pressure plates in the disengaged condition.

Terminal pressure plate 18 includes a circumferential pattern of projections 33 providing seats for one end of a similar pattern of engaging springs 34. The opposite ends of engaging springs 34 are separated in the projections 36 formed in drive housing 13. Engaging springs 34 are arranged and disposed to urge pressure plates 17, 18 and friction plates 27, 28 toward the engaged condition. Terminal pressure plate 18 also includes pairs of lugs such as lug 37, which provide pivotal connectors 39 for mounting disengaging levers 38. Levers 38 are also supported on pivotal connectors 41 which are secured to housing 13 by means of fasteners 42. The radially inner portions of levers 38 are provided with adjustable contact buttons 43. Axial thrust on the buttons is effective to pivot levers 38 in a direction to move pressure plate 18 away from flywheel 14 against the bias of springs 34 to the disengaged position.

Intermediate pressure plate 17 is provided with separating means spaced around the periphery for axially separating the pressure plates in the disengaged condition. Separating means 44 includes a mounting bracket 46 secured to the intermediate pressure plate by cap screws 47. A compound cam 48 is pivotally mounted on bracket 46 by means of connector 49. Cam 48 includes a pair of camming surfaces 51, 52 extending substantially equal distances in opposite directions from the pivotal connector 49, surface 51 extending into contact with flywheel 14 and surface 52 extending into contact with terminal pressure plate 18. Intermediate pressure plate 17 includes a pair of posts 53, 54 providing a mounting for a compound spiral wound spring 56. Spring 56 has a midportion 57 extending between posts 53, 54 and terminates in a pair of resilient end portions 58, 59. Each end portion 58, 59 bears against cam 48, urging pivotal movement of cam 48 in a direction to effect axial separating movement of terminal pressure plate 18 from flywheel 14.

When disengaging levers 38 are actuated to move terminal pressure plate 18 axially to the disengaged position, cam 48 is pivoted about connector 49 by spiral spring 56. Camming surface 51 bearing against flywheel 14 during pivotal movement causes pivotal connector 49 to move intermediate pressure plate 17 axially away from the flywheel. The camming surface 52 engaging terminal pressure plate 18 limits the pivotal movement of cam 48 and therefore the axial movement of intermediate plate 17 such that the intermediate plate is repositioned midway between the terminal pressure plate and flywheel. The repositioning of intermediate pressure plate midway between the flywheel and terminal pressure plate provides substantially equal clearances adjacent friction plates 27, 28 to avoid frictional drag in the disengaged condition.

Having thus described a preferred embodiment of the invention in the foregoing description, it is to be understood that modifications and alterations thereof remain within the spirit of the invention and scope of the following claims.

I claim:

1. A torque transmitting device having a rotatable input assembly including a drive housing and multiple axially-spaced pressure plates, and a rotatable output assembly including multiple friction plates arranged alternately with respect to said pressure plates, said pressure plates and friction plates being axially shiftable in one direction into frictional engagement with each other defining an engaged condition for selectively coupling said input assembly to said output assembly in torque transmitting relationship, said drive housing including multiple axially-spaced offset flange portions substantially in alignment with said pressure plates, said input assembly further including a plurality of chordally disposed elongated flexible drive straps connected between said flange portions of said drive housing and respective pressure plates providing parallel and independent driving means for dividing the torque transmitted from said drive housing among said pressure plates.

2. A torque transmitting device according to claim 1 in which said input assembly includes a flywheel secured to said drive housing, a terminal pressure plate axially-spaced from said flywheel and an intermediate pressure plate disposed between said flywheel and said terminal pressure plate, said torque transmitting device having separating means for axially shifting said pressure plates away from frictional engagement with said friction plates defining a disengaged condition, said separating means including a compound cam having a pivotal mounting on said intermediate pressure plate including a pair of camming surfaces extending oppositely substantially equidistant from said pivotal mounting, one of said camming surfaces extending into close proximity with said flywheel and the other of said camming surfaces extending into close proximity with said terminal pressure plate, said cam exerting separating thrust on said flywheel, said intermediate pressure plate and said terminal pressure plate in response to pivotal movement thereof, providing substantially equal axial spacing between said flywheel and intermediate pressure plate and between said intermediate pressure plate and said terminal pressure plate in said disengaged condition.

3. A torque transmitting device according to claim 2 in which said separating means includes a compound spiral wound spring connected between said intermediate pressure plate and said cam, said spring having a midportion secured to said intermediate pressure plate and a pair of resilient end portions bearing against said cam, each of said resilient end portions biasing said cam for pivotal movement with respect to said intermediate pressure plate.